United States Patent
Wallgren et al.

(10) Patent No.: US 12,257,702 B2
(45) Date of Patent: Mar. 25, 2025

(54) SYSTEM COMPRISING AN INDUSTRIAL ROBOT AND AN END EFFECTOR WITH POWER TOOL AND CHARGER

(71) Applicant: ATLAS COPCO INDUSTRIAL TECHNIQUE AB, Stockholm (SE)

(72) Inventors: Johan Wallgren, Stockholm (SE); Nicholas Sävenlid, Nacka (SE)

(73) Assignee: ATLAS COPCO INDUSTRIAL TECHNIQUE AB, Stockholm (SE)

( * ) Notice: Subject to any disclaimer, the term of this patent is extended or adjusted under 35 U.S.C. 154(b) by 0 days.

(21) Appl. No.: 18/712,881

(22) PCT Filed: Nov. 1, 2022

(86) PCT No.: PCT/EP2022/080437
§ 371 (c)(1),
(2) Date: May 23, 2024

(87) PCT Pub. No.: WO2023/099101
PCT Pub. Date: Jun. 8, 2023

(65) Prior Publication Data
US 2024/0326267 A1    Oct. 3, 2024

(30) Foreign Application Priority Data
Dec. 2, 2021    (SE) .................................. 2130340-9

(51) Int. Cl.
*B25J 19/00*    (2006.01)
*B25J 15/00*    (2006.01)
*B25J 15/04*    (2006.01)

(52) U.S. Cl.
CPC ....... *B25J 19/0025* (2013.01); *B25J 15/0019* (2013.01); *B25J 15/04* (2013.01); *B25J 19/005* (2013.01)

(58) Field of Classification Search
CPC .... B25J 15/0019; B25J 15/04; B25J 19/0025; B25J 19/005
See application file for complete search history.

(56) References Cited

U.S. PATENT DOCUMENTS

| | | | |
|---|---|---|---|
| 9,662,786 B2 | 5/2017 | Nagai et al. | |
| 10,286,564 B2 | 5/2019 | Baumgartner | |
| 2004/0181311 A1 | 9/2004 | Katsuta | |
| 2005/0244260 A1* | 11/2005 | Deplano | B25J 19/005 |
| | | | 414/730 |
| 2006/0279245 A1 | 12/2006 | Hashimoto et al. | |
| 2008/0092689 A1 | 4/2008 | Shiraki et al. | |

(Continued)

FOREIGN PATENT DOCUMENTS

| | | |
|---|---|---|
| DE | 102017103528 A1 | 8/2018 |
| EP | 1591210 A1 | 11/2005 |

(Continued)

OTHER PUBLICATIONS

Atlas Copco Industrial Technique AB, International Patent Application No. PCT/EP2022/080437, International Search Report, Feb. 8, 2023.

(Continued)

*Primary Examiner* — William C Joyce
*Assistant Examiner* — Gregory T Prather
(74) *Attorney, Agent, or Firm* — Moore & Van Allen PLLC; W. Kevin Ransom

(57) ABSTRACT

A system comprising: an industrial robot comprising a robot arm end portion and a power supply circuit arranged to supply current to the robot arm end portion, and an end effector comprising a power tool and an accumulator module (such as a battery) arranged to power operation of the power tool, the end effector being attached to the robot arm end portion, the end effector further comprising a charger arranged to draw current from the power supply circuit at the robot arm end portion and to supply charging current to the accumulator module. Charging of the accumulator module for the power tool is facilitated and the efficiency of the manufacturing process is increased.

15 Claims, 2 Drawing Sheets

(56) References Cited

U.S. PATENT DOCUMENTS

| | | | | |
|---|---|---|---|---|
| 2010/0184575 A1* | 7/2010 | Williams | ............... | B25J 15/04 |
| | | | | 483/13 |
| 2015/0120041 A1 | 4/2015 | Wise et al. | | |
| 2015/0136505 A1 | 5/2015 | Bystedt | | |
| 2017/0205798 A1 | 7/2017 | Ishii | | |
| 2018/0311835 A1* | 11/2018 | Baumgartner | ......... | B25J 19/005 |
| 2022/0176573 A1* | 6/2022 | Zimmer | .................. | H02P 3/14 |
| 2023/0107709 A1* | 4/2023 | Zahdeh | ................ | B25J 19/005 |
| | | | | 701/50 |
| 2024/0009868 A1* | 1/2024 | Motooka | ................ | B25J 9/044 |

FOREIGN PATENT DOCUMENTS

| EP | 3849052 A1 | 7/2021 |
|---|---|---|
| JP | 2003136462 A | 5/2003 |
| JP | 2017127908 A | 7/2017 |
| SE | 1250399 A1 | 10/2013 |
| WO | 2011080393 A1 | 7/2011 |

OTHER PUBLICATIONS

Atlas Copco Industrial Technique AB, International Patent Application No. PCT/EP2022/080437, Written Opinion, Feb. 8, 2023.
Atlas Copco Industrial Technique AB, International Patent Application No. PCT/EP2022/080437, International Preliminary Report on Patentability, Jul. 10, 2023.
Atlas Copco Industrial Technique AB, Swedish Patent Application No. 2130340-9, Office Action, Jun. 20, 2022.
Atlas Copco Industrial Technique AB, Japanese Patent Application No. 2024-531283, Office Action, Oct. 3, 2024.

* cited by examiner

SYSTEM COMPRISING AN INDUSTRIAL ROBOT AND AN END EFFECTOR WITH POWER TOOL AND CHARGER

CROSS-REFERENCE TO RELATED APPLICATIONS

This application is a National Stage Patent Application (filed under 35 § U.S.C. 371) of PCT/EP2022/080437, filed Nov. 1, 2022 of the same title, which, in turn claims priority to Swedish Patent Application No. 2130340-9 filed Dec. 2, 2021 of the same title; the contents of each of which are hereby incorporated by reference.

FIELD OF THE INVENTION

The present disclosure generally relates to the field of industrial robots having end effectors for operating power tools. More specifically, the present disclosure relates to charging accumulator modules for powering such power tools.

BACKGROUND OF THE INVENTION

In manufacturing industry, industrial robots may be used to process objects by means of power tools. Such industrial robots are equipped with a so called end effector, which is a device attached to the end of the robot arm and designed to interact with the objects and/or surrounding environment. The end effector is usually referred to as the last link of the robot. The end effector may typically comprise the power tool and is mounted to the robot arm end portion. The end effector may also comprise some kind of (energy) accumulator module, such as a battery, to power operation of the power tool.

The accumulator module needs to be regularly charged in order to power the power tool properly. The robot then typically unloads the empty accumulator module in a charger stand, and picks up another, charged, accumulator module from the stand. This process is cumbersome and time consuming and, thus, reduces the efficiency of the manufacturing process.

SUMMARY OF THE INVENTION

It would be advantageous to achieve a system overcoming, or at least alleviating, the above mentioned drawback. In particular, it would be desirable to enable a system facilitating charging of power tools operated by industrial robots.

To better address one or more of these concerns, a system having the features defined in the independent claim is provided. Preferable embodiments are defined in the dependent claims.

A system is provided comprising an industrial robot comprising a robot arm end portion and a power supply circuit arranged to supply current to the robot arm end portion. The system further comprises an end effector comprising a power tool and an (energy) accumulator module arranged to power operation of the power tool. The end effector is attached to the robot arm end portion. The end effector further comprises a charger arranged to draw current from the power supply circuit at the robot arm end portion and to supply charging current to the accumulator module.

The inventors have realized that the current available at the robot arm end portion can be utilized to charge the accumulator module for the power tool. The current available from the power supply circuit of a standard industrial robot is typically not enough to provide the power tool with its peak operating current, but it may be used to continuously charge the accumulator module when needed. Hence, the accumulator module may provide the power tool with its peak power during operation, while the current from the industrial robot is utilized for recharging the accumulator module as needed. This reduces the need of replacing empty accumulator modules with charged ones, which saves time in the manufacturing process. Further, the need for a separate charging stand for accumulator modules is reduced, which saves resources in the manufacturing process. In conclusion, charging of the accumulator module for the power tool is facilitated and the efficiency of the manufacturing process is increased.

For example, the system may be arranged such that the charging current (available from the power supply circuit of the industrial robot) is a fraction of a peak current consumed by the power tool during its operation, such as less than $\frac{1}{3}^{rd}$ of the peak current consumed by the power tool during its operation, such as less than $\frac{1}{5}^{th}$ of the peak current consumed by the power tool during its operation, such as around $\frac{1}{10}^{th}$ of the peak current consumed by the power tool during its operation.

For example, the current available from the power supply circuit may be around 1-3 A, while the peak current consumed by the power tool may be around 15 A-30 A. Hence, the accumulator module may be utilized to provide the relatively high peak current needed for operating the tool, while the relatively low current available from the industrial robot is used for charging the accumulator module.

For example, the capacity of the accumulator module may be adapted to provide an entire peak current consumption of the power tool when it is operated. Hence, the main power source for operating the power tool may be the accumulator module.

According to an embodiment, the system may further comprise a control device configured to control the charging of the accumulator module by the charger. Hence, the control device may be utilized to manage the charging of the accumulator module in different ways, thereby enabling several advantages as will be described further below.

The term "control device" is to be broadly interpreted as any means, distributed or centralized, configured to control the charging of the accumulator module. The control device may alternatively be referred to as a control unit, control system or control circuit.

According to an embodiment, the control device may be configured to control the charging current to be below a (preset) current threshold being less than the total available current from the power supply circuit (of the industrial robot). Hence, part of the current from the power supply circuit may be utilized for other purposes, such as for a vison camera or a gripping tool installed at the industrial robot. For example, if the total available current from the industrial robot is around 2 A, the charging current may be controlled to not exceed a current threshold of 0.7 A.

According to an embodiment, the current threshold may simply be preset, such as to a static value. For example, it may be preset by an operator setting up the system or preset factory wise.

According to another embodiment, the current threshold may be based on one or more dynamic parameters (e.g. control signals), which enables a smarter control of the charging. For example, if a control system of the robot indicates that the robot and its power tool is not to be operated for a certain period of time, the current threshold can be increased, thereby speeding up the charging of the accumulator module. On the other hand, if more current is needed for operation of the industrial robot, the threshold may be lowered.

According to an embodiment, the control device may be configured to control the charging such that the accumulator module is charged by the charger between operations performed by the power tool, and optionally also during operations performed by the power tool.

According to embodiments, the control device may be arranged in the industrial robot and/or in the end effector. For example, the control device may be arranged in the accumulator module, in the power tool or in a holder of the end effector for holding the power tool. Alternatively, the control device may be arranged separate from, but in communication to, the industrial robot and the end effector.

According to an embodiment, the control device may be configured to control the charging such that a charging level of the accumulator module is kept below a maximum charge capacity of the accumulator module, such as below 80% of the maximum charge capacity of the accumulator module, such as below 70% of the maximum charge capacity of the accumulator module, such as below 60% of the maximum charge capacity of the accumulator module. Having an upper charging limit increases the energy accumulator life time, and is particularly advantageous in the present system since the accumulator module may be connected to the charger for most of the time.

According to an embodiment, the control device may be configured to control the charging such that a charging level of the accumulator module is kept above a minimum threshold, such as above 20% of the maximum charge capacity of the accumulator module, such as above 30% of the maximum charge capacity of the accumulator module, such as above 40% of the maximum charge capacity of the accumulator module. Avoiding the accumulator module getting fully depleted increases its life time and reduces the risk of interrupted operation of the power tool.

As the accumulator module in the present system may be connected to the charger for most of the time and, in addition, time consuming operations of replacing an empty accumulator module can be avoided, a relatively small state of charge window can be used, which is beneficial for the accumulator module health.

According to an embodiment, the control device may be configured to trigger a warning signal when the charging level of the accumulator module is too low and/or too high. This is to reduce the risk of the accumulator module getting depleted, which may interrupt the manufacturing process as the power tool cannot be operated, and/or the risk of the accumulator module being more charged than wanted, which may be unhealthy for the accumulator module.

For example, a warning signal may be provided if the charging level of the accumulator module is below a certain threshold defining a lowest acceptable charging level, and/or above another certain threshold defining a highest acceptable charging level.

According to an embodiment, the end effector may comprise a holder arranged to hold the power tool, the holder being attached to the robot arm end portion. This facilitates changing power tool, e.g. to another type of power tool. Hence, the power tool and holder may be separate parts.

Alternatively, the power tool may be an integrated part of the end effector. Changing power tool may then include changing the whole end effector.

According to embodiments, the charger may be arranged at the power tool, or elsewhere in the end effector, such as at the holder.

According to an embodiment, the accumulator module may be attached and connected to the charger.

According to an embodiment, the robot arm end portion may comprise an electrical contact (such as a socket) adapted to mate with an electrical contact of the end effector for electrically connecting the charger of the end effector with the power supply circuit of the industrial robot.

It is noted that embodiments of the invention relates to all possible combinations of features recited in the claims.

BRIEF DESCRIPTION OF THE DRAWINGS

The system will now be described in more detail in the following illustrative and non-limiting detailed description of embodiments, with reference to the appended drawings.

All the figures are schematic, not necessarily to scale, and generally only show parts which are necessary in order to elucidate the embodiments, wherein other parts may be omitted. Like reference numerals refer to like elements throughout the description.

DETAILED DESCRIPTION OF EMBODIMENTS

Figure 1:
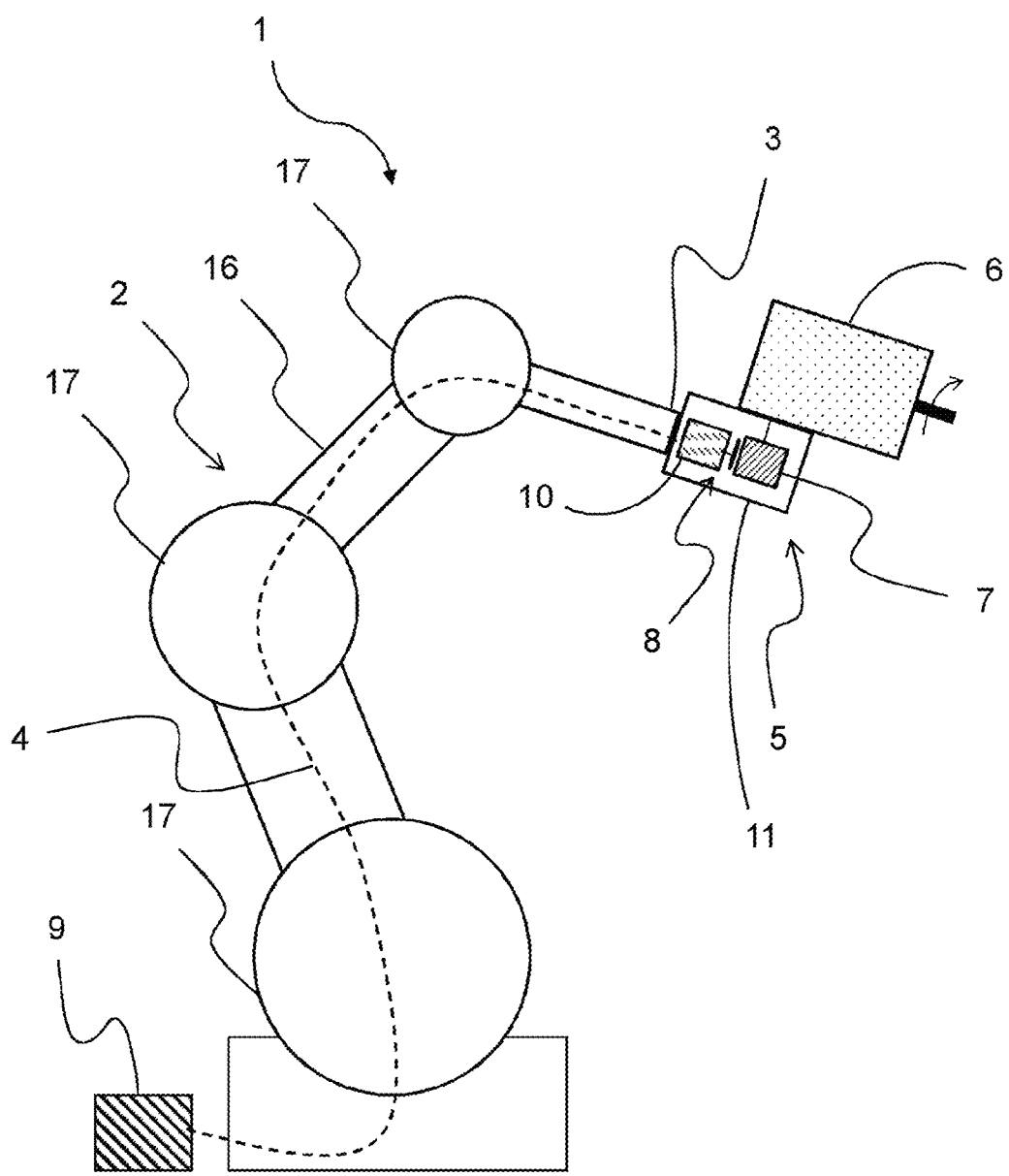
FIG. 1 shows a system according to an embodiment.

As illustrated in FIG. 1, a system 1 according to an embodiment comprises an industrial robot 2 and an end effector 5 to be operated by the robot 2. The system 1 may be automated and capable of movement on at least one, but preferably two or more axes. For example, the system 1 may be adapted to be used for manufacturing, such as for assembling parts.

The industrial robot 2 may comprise a robot arm 16, which may have one or more joints 17 for enabling movement of the robot arm 16 around one or more axes. A robot arm end portion 3 is provided at the distal end of the robot arm 16. The industrial robot 2 further comprises a power supply circuit 4 arranged to supply current to the robot arm end portion 3. The power supply circuit 4 may e.g. draw current from the mains. The power supply circuit 4 may comprise, or be connected to, a control device 9 for the industrial robot 2. The control device 9 may be configured to control the power supply circuit 4. For example, the industrial robot 2 may be stationary and may be arranged to be placed along an assembly line.

The end effector 5 is attached to the robot arm end portion 3 and comprises a power tool 6 and an accumulator module 7 arranged to power operation of the power tool 6. The power tool 6 may e.g. be some kind of tightening tool, riveting tool, or drill.

The accumulator module 7 may e.g. comprise a battery, a capacitor or any other kind of means for accumulating energy to be used for powering the tool 6.

For example, the end effector 5 may comprise a holder 11 arranged to hold the power tool 6. The holder 11 may be the part of the end effector 5 that is attached to the robot arm end portion 3. The power tool 6 may be mounted to the holder 11. Alternatively, the holder 11 may be integrated with the power tool 6. For example, the accumulator module 7 may be attached to/comprised in the holder 11 as illustrated in FIGS. 1 and 2, or be attached to/comprised in the power tool 6 (not shown).

The end effector 5 further comprises a charger 8 arranged to draw current from the power supply circuit 4 at the robot arm end portion 3 and to supply charging current to the accumulator module 7. An electrical connection may be provided between the power supply circuit 4 at the robot arm end portion 3 and the charger 8 in the end effector 5 so as to supply current there between for enabling charging. The charger 8 may comprise an electrical contact 15 adapted to mate with an electrical contact 14 of the accumulator module 7 (see FIG. 2). During operation, current flows from the power supply circuit 4 to the end effector 5 and its' charger 8, and then from the charger 8 to the accumulator module 7. Preferably, the accumulator module 7 may be connected (and attached) to the charger 8 during operation of the system 1, including operation of the power tool 6.

The system 1 may further comprise a control device 10 configured to control the charging of the accumulator module 7 by the charger 8. The control device 10 may be arranged in the end effector 5, such as in the holder 11 as illustrated in FIG. 1, or in the power tool 6 (not shown). Alternatively, the control device 10 may be arranged in the industrial robot 2, such as in (or in connection to) the control device 9 for the power supply circuit 4.

Figure 2:
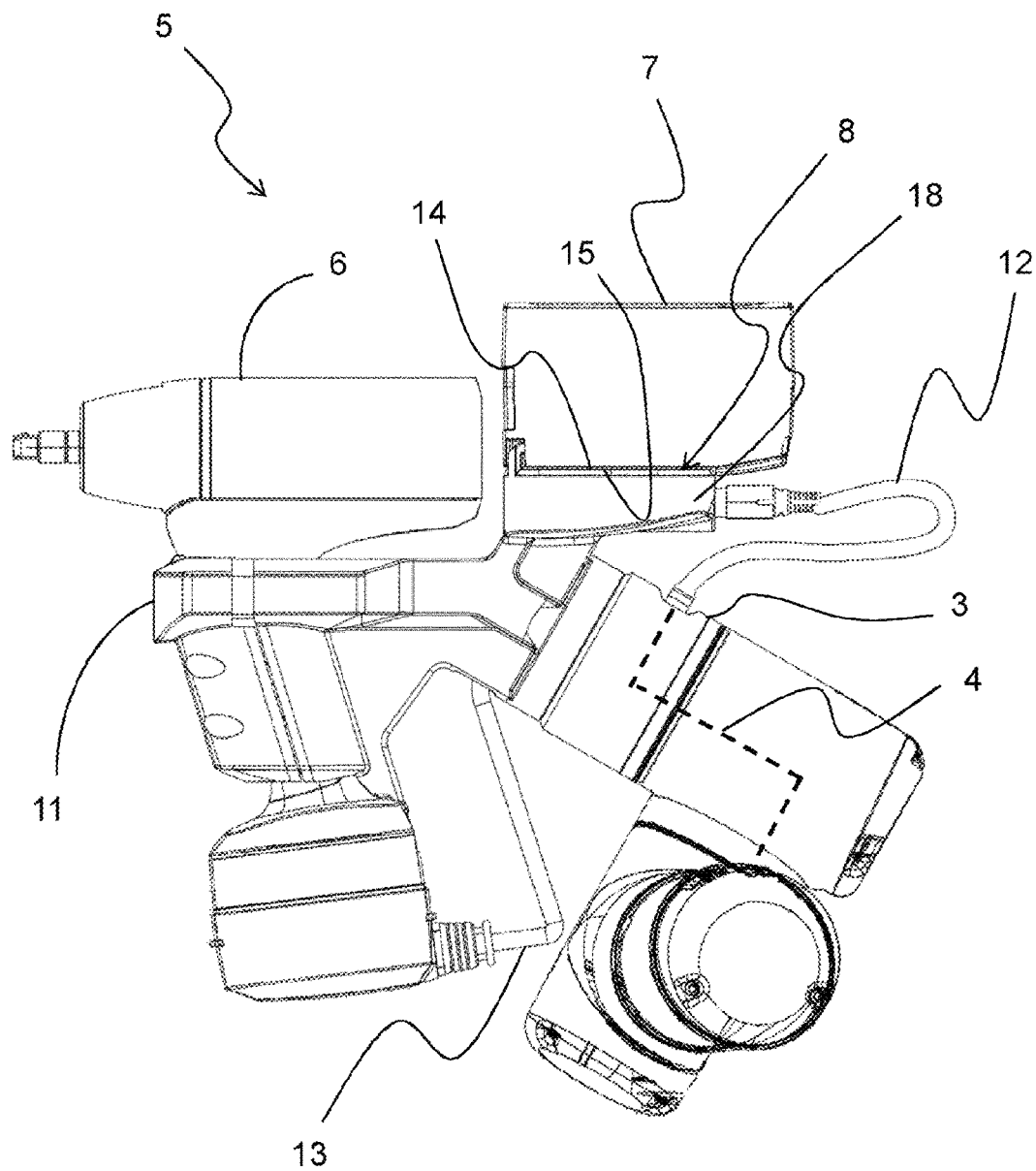
FIG. 2 shows a part of the system including the end effector and the robot arm end portion in more detail.

Turning now to FIG. 2, embodiments of the system 1 will be described in more detail. For example, the holder 11 may comprise a charger portion 18 including the charger 8 and arranged to hold the accumulator module 7. A cable 12 may provide the charger portion 18 with power from the power supply circuit 4 in the robot arm end portion 3. The cable 12 may be routed outside or inside (the latter not shown) the robot arm end portion 3 and the end effector 5. The end effector 5 may comprise circuitry for providing power from the accumulator module 7 to the power tool 6. For example, a cable 13 may provide the power tool 6 with power from the charger portion 18.

According to an embodiment, the charging current for charging the accumulator module 7 may be just a fraction of the peak current that is consumed by the power tool 6 during its operation. The power tool 6 may typically require a peak current around 15-30 A when operated while the charging current may be limited to around 0.5-3 A. For example, the charging current may be less than $\frac{1}{3}^{rd}$ of the peak current consumed by the power tool 6 during its operation, such as less than $\frac{1}{5}^{th}$ of the peak current consumed by the power tool 6 during its operation.

For example, the accumulator module 7 may have a capacity that can provide the power tool 6 with its peak current during operation. The accumulator module 7 may e.g. comprise a 18, 24, 36 or 48 V battery.

According to an embodiment, the control device 9 may be configured to control the charging of the accumulator module 7 such that the charging current is kept below a (preset or dynamic) threshold being lower than the total available current from the power supply circuit 4. Hence, the charging of the power tool 6 may only utilize some of the available current from the industrial robot 2, thereby enabling some of the current available from the industrial robot 2 to be utilized for other purposes.

The power tool 6 may be charged only between operations of the power tool 6, or simply continuously as long as the charging level of the accumulator module 7 is below a certain (preset) threshold.

The control device 10 may be configured to control the charging level of the accumulator module 7 to be below a (preset) maximum threshold and optionally also above a (preset) minimum threshold. This may be referred to as the state of charge window of the accumulator module 7. The state of charge window may e.g. have a lower threshold comprised within a range of 20-40% of the maximum charge capacity. The upper threshold may be comprised within a range of 60-80% of the maximum charge capacity. As the accumulator module 7 can be continuously charged in the end effector 5, the state of charge window may be kept relatively small, which is beneficial for the accumulator module 7 health.

According to an embodiment, the control device 10 may be configured to provide a warning signal in response to the charging level of the accumulator module 7 falling below a minimum threshold and/or exceeding a maximum threshold. An operator of the system 1 may then be notified that charging of the accumulator module 7 has not been performed as excepted. The warning signal may e.g. be a visual signal and/or an audio signal.

The person skilled in the art realizes that the present invention by no means is limited to the embodiments described above. On the contrary, many modifications and variations are possible within the scope of the appended claims.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A system comprising:
   an industrial robot comprising a robot arm end portion and a power supply circuit arranged on the robot arm to thereby provide a supply of electric current to the robot arm end portion; and
   an end effector attached to the robot arm end portion, said end effector comprising:
   a power tool;
   an accumulator module arranged to power operation of and arranged to supply a current sufficient to meet a peak current consumption of the power tool during operation of the power tool; and
   a charger in electrical contact with the power supply circuit at the robot arm end portion and arranged in electrical contact with the accumulator module to supply charging electrical current to the accumulator module from the power supply circuit.

2. The system as defined in claim 1, wherein the charging electrical current is a fraction of the peak current consumption of the power tool during its operation of the power tool, selected from the group of:
   less than one-third of the peak current consumed by the power tool during operation of the power tool, and
   less than one-fifth of the peak current consumed by the power tool during operation of the power tool.

3. The system as defined in claim 1, further comprising a control device configured to control charging of the accumulator module by the charger.

4. The system as defined in claim 3, wherein the control device is configured to control the charging electrical current to be below a current threshold being less than a total available current from the power supply circuit.

5. The system as defined in claim 4, wherein said current threshold is preset.

6. The system as defined in claim 4, wherein said current threshold is based on one or more dynamic parameters.

7. The system as defined in claim 3, wherein the control device is configured to control the charging, such that the accumulator module is charged by the charger between operations performed by the power tool.

8. The system as defined in claim 3, wherein the control device is arranged in the industrial robot and/or in the end effector.

9. The system as defined in claim 3, wherein the control device is configured to control said charging such that a charging level of the accumulator module is kept below a maximum charge capacity of the accumulator module selected from the group of:
 below 80% of the maximum charge capacity of the accumulator module
 below 70% of the maximum charge capacity of the accumulator module, and
 below 60% of the maximum charge capacity of the accumulator module.

10. The system as defined in claim 3, wherein during operation of the system the control device is configured to control said charging such that a charging level of the accumulator module is kept above a minimum threshold, selected from the group of:
 above 20% of the maximum charge capacity of the accumulator module
 above 30% of the maximum charge capacity of the accumulator module, and
 above 40% of the maximum charge capacity of the accumulator module.

11. The system as defined in claim 3, wherein the control device is configured to trigger a warning signal when a charging level of the accumulator module is one of: below a low threshold, and/or a high threshold.

12. The system as defined in claim 3, wherein the end effector comprises a holder arranged to hold the power tool, wherein the holder is attached to the robot arm end portion.

13. The system as defined in claim 3, wherein the control device is configured to control the charging such that the accumulator module is charged by the charger between operations performed by the power tool and during operations performed by the power tool.

14. The system as defined in claim 3, wherein the control device is configured to control the charging continuously as long as a charging level of the accumulator module is below a threshold.

15. The system as defined in claim 3, wherein the control device is configured to control said charging such that a charging level of the accumulator module is kept below a maximum charge capacity of the accumulator module and above a minimum threshold.

* * * * *